United States Patent [19]

Sood

[11] Patent Number: 5,721,762
[45] Date of Patent: Feb. 24, 1998

[54] SHARED BASE STATIONS FOR VOICE AND DATA CELLULAR TELECOMMUNICATIONS AND METHOD

[75] Inventor: Prem Sood, Vancouver, Wash.

[73] Assignees: Sharp Microelectronics Technology, Inc., Camas, Wash.; Sharp Kabushiki Kaisha, Osaka, Japan

[21] Appl. No.: 579,452

[22] Filed: Dec. 27, 1995

Related U.S. Application Data

[63] Continuation of Ser. No. 160,499, Dec. 1, 1993, abandoned.

[51] Int. Cl.$^6$ .................................................. H04H 11/00
[52] U.S. Cl. ................................ 379/59; 379/58; 379/60; 455/33.1
[58] Field of Search .......................... 379/59, 58, 60, 379/63, 57; 455/33.1, 33.3, 33.4, 31.1, 33.2

[56] References Cited

U.S. PATENT DOCUMENTS

| | | | |
|---|---|---|---|
| 4,654,867 | 3/1987 | Labedz et al. | 379/59 |
| 4,675,863 | 6/1987 | Paneth et al. | 370/50 |
| 4,887,265 | 12/1989 | Felix | 370/94.1 |
| 4,912,756 | 3/1990 | Hop | 155/54 |
| 5,119,397 | 6/1992 | Dahlin et al. | 375/5 |
| 5,136,586 | 8/1992 | Greenblatt | 370/110.4 |
| 5,526,404 | 6/1996 | Wiedeman et al. | 379/60 |
| 5,598,457 | 1/1997 | Foladare | 379/58 |
| 5,608,780 | 3/1997 | Gerszberg | 379/58 |
| 5,612,990 | 3/1997 | Meier | 379/58 |
| 5,619,551 | 4/1997 | Yahagi | 379/60 |
| 5,629,974 | 5/1997 | Rajala et al. | 379/58 |

FOREIGN PATENT DOCUMENTS 0021145  1/1981  European Pat. Off. .

OTHER PUBLICATIONS

Cellular Busines, Jul. 1992, p. 6. "Carriers promote data standard".
Micro Cellular News, Apr. 25, 1992, pp. 3–4 "Eight U.S. Carriers Support IBM Data–Over–Cellular Protocol".
Micro Cellular News, Jun. 10, 1992, pp. 4–5 IBM Unveils Cellular Digital Packet Data Press Release, from Waggener Edstrom, May 11, 1993.
"Cellular Digital Packet Data Group Releases 0.9 Specification as Planned".
Press Release, from Waggener Edstrom, Jul. 21, 1993 "Cellular Digital Packet Data Group Releases 1.0 Specification as Planned".
"CDDD: The Future of Cellular Data Communications"; FCSI, Nov. 1993.

*Primary Examiner*—Edward L. Coles, Sr.
*Assistant Examiner*—Madeleine Av Nguyen
*Attorney, Agent, or Firm*—David C. Ripma; Gerald W. Maliszewski

[57] ABSTRACT

The present invention provides a system and method for using the brief time intervals between cellular telephone calls on a primary cellular network to transmit and receive data over a second data-only network. The invention uses the built-in capability of the primary network to monitor and track each call and to identify the relatively short-duration intervals between each call to pinpoint when a short burst of data from the second network can be transmitted without interfering with primary network calls. The data network includes a separate telephone exchange. Selected base stations of the primary cellular network are shared with the data-only network. Land lines or other connections link the data network exchange with the shared base stations. Preferably, the data network is accessible via a public packet data network. Data calls on the second network are directed to the shared base stations and inserted into the brief intervals between primary network calls. The data calls provide discontinuous, "virtual" connections between the users of the data network. A particular advantage of the invention is that it allows the cellular base stations, transceivers, and allocated frequencies to be shared between a primary and a secondary cellular telephone network, without interfering with or reducing the capacity of the primary network. The invention works with analog or digital primary cellular networks, including those using multiple access methods such as TDMA. A method of carrying out the invention is also disclosed.

8 Claims, 4 Drawing Sheets

SHARED BASE STATIONS FOR VOICE AND DATA CELLULAR TELECOMMUNICATIONS AND METHOD

This application is a continuation of application Ser. No. 08/160,499, filed Dec. 1, 1993, now abandoned.

BACKGROUND AND SUMMARY OF THE INVENTION

The present invention relates generally to cellular telecommunications systems of the type which employ a plurality of cellular base stations to send and receive multiple simultaneous calls between a central telephone exchange and a plurality of mobile cellular telephones, and more particularly to a system for increasing the utilization of the cellular base stations in a primary cellular network by sending and receiving intermittent data packets over a secondary cellular network during the intervals between primary network calls.

Cellular telecommunications networks employ a plurality of cellular base stations which broadcast and receive low power radio signals over a limited coverage area, or "cell." The base stations are strategically positioned throughout a territory or region to communicate with cellular telephone subscribers. Each base station in a cellular network includes a plurality of cellular transceivers, each of which operates at a pair of selected predetermined send/receive frequencies capable of handling one or more two-way telephone calls. Present system designs typically allocate approximately 56 to 98 broadcast frequency pairs to each base station. Most transceivers in a base station carry subscriber calls, although one or two of the transceivers will be assigned to broadcast and receive control and request-for-service signals which enable the base station to identify new incoming cellular calls.

In a cellular system designed for transmitting and receiving analog radio signals, each transceiver in a base station provides a single cellular "channel" capable of carrying a two-way cellular "call." Digital cellular systems digitize each call and encode the radio signal broadcasts to provide a plurality of cellular channels on each pair of radio frequencies. One prior art method for digitizing cellular calls to increase the number of cellular channels is referred to herein as time-division multiplexing. With time-division multiplexing, each signal carries several digitized cellular channels, each in a separate time slot, and each channel is independently recoverable by a time-synchronized decoder. One existing standard for time-division multiplexing is TDMA (for "Time Division Multiple Access"), which is a dual-mode mobile station-based station compatibility standard familiar to those skilled in the art. Information about TDMA can be obtained from the Telecommunications Industry Association, Engineering Department, 2001 Pennsylvania Avenue, N.W., Washington, D.C. 20006, by referencing standard IS-54, Rev. B, dated April 1992, or later updates.

The number of simultaneous calls which can be handled on a given number of cellular broadcast frequencies depends on whether and what type of multiplexing is employed. Both analog and digital systems provide multiple "cellular channels" for handling multiple simultaneous cellular calls. As used herein, the term "cellular channel" means a two-way radio telecommunications link capable of carrying a cellular call between users of a cellular network. Time-division multiplexing using the current TDMA standard permits a single radio frequency pair to carry three independent telephone calls simultaneously. Consequently, each transceiver in a base station is capable of handling three separate cellular channels simultaneously. Analog systems carry one cellular channel per transceiver.

In any cellular telecommunications network, calls are routed through a central cellular telephone exchange (also called the "central exchange" or the "network exchange") to a plurality of cellular base stations located throughout a service region. The base stations provide the radio links from the exchange to the mobile cellular subscribers. When a caller accesses the cellular network to call an individual subscriber, a signal is sent throughout the region to identify the base station that is closest to the subscriber. A signal is then sent to the mobile subscriber's telephone instructing the telephone's transceiver to tune to whichever transmit/receive frequencies will be employed to carry the call. Each mobile cellular telephone is designed to tune to any selected frequency pair used by base stations on the network. The central exchange tracks all calls through the network and routes calls through selected base stations, the choice of base station being determined by the location of the mobile cellular user or subscriber.

The cellular base stations in a network are connected to the central cellular telephone exchange by land lines, microwave links, or similar permanent connections which extend throughout the network service region. A cellular subscriber is able to move freely throughout the region during a single call because the call is handed off from one base station to another as the user leaves one cell and enters the next. The hand-off is accomplished by the network instructing the subscriber's cellular telephone to switch from the send/receive frequencies used by the base station transceiver in the cell being exited to a new pair of frequencies used by the new transceiver in the cell being entered, while the exchange simultaneously reroutes the call to the appropriate base station. Cellular networks are designed to accomplish the hand-off without interrupting the call. The central exchange performs the call hand-off process as often as required to maintain the continuity of the wireless connection with the subscriber.

At the operational heart of every cellular network is a system for monitoring the status of each cellular call. It is essential that the network be aware of the availability status of each cellular channel at each base station. Some cellular systems use the base station controller, which is a call switching and control unit within each base station, to monitor the status of all calls at each base station. Some cellular systems monitor every call at every base station through the central telephone exchange. Regardless of where the call monitoring is done, there exists somewhere in all cellular telephone networks a cellular channel monitoring system for determining the status of every cellular call on the network. The channel monitoring system has access to a variety of call status information including when each call is terminated at each base station and when each cellular channel becomes available to carry a new call. It is on the basis of that information that new cellular calls are routed through the network.

Sometimes the requests for cellular channels exceed the available supply, representing an overload condition on the network which degrades service to the subscribers. Because radio channel spectrum is limited and call volume is increasing, most cellular networks and base stations will occasionally be overloaded. Thus, there is a continuing need for improved techniques which will increase the carrying capacity of the available spectrum. Given the large increase in the anticipated and projected use of personal wireless communications, the need for more efficient use of the broadcast spectrum should continue even if additional spectrum is made available.

Data calls between computers represent one class of cellular telephone calls increasingly carried by cellular telephone networks. Data calls are often discontinuous, requiring intermittent exchanges of data separated by substantial intervals of blank time. Consequently, it is usually wasteful and expensive to employ a voice channel solely as a connection between computers. Nevertheless, as computers become more portable, there is an increasing demand for telephone data connections to and from mobile portable computers. In particular, there is a need to find new ways to meet the demand for data transmission over cellular networks without the expense and system loading imposed when voice channels are used exclusively for data communication.

Specialized data networks presently exist for carrying data between computers in the form of data "packets," which are short-duration compressed and encoded bursts of data. Such data-only networks are far more economical for data transmission than conventional long-distance telephone carriers. One well-known type of data network is called a Public Switched Packet Data Network ("PSPDN"), also called a Public Packet Data Network ("PPDN"). The PSPDN is designed to packetize digital information and send it inexpensively over dedicated lines, or intermittently over the public telephone network, at a considerable savings over analog long-distance rates.

Development of a cellular equivalent to the PSPDN is currently underway. One technique suggested, but not yet implemented in the cellular industry, utilizes the "blank" time between each analog cellular call to carry data packets between customers who require digital communications connections. This system is generally referred to as Cellular Digital Packet Data service, or CDPD. CDPD takes advantage of the short delay between cellular calls, when a channel is idle at the conclusion of one call before it has been assigned a new call. A system employing CDPD scans the cellular frequencies to identify channels (i.e., frequencies) which are momentarily idle. When an open channel is found, the system briefly turns on a nearby CDPD base station to transmit and receive data on the idle frequencies. The CDPD proposal employs a separate network of base stations and transceivers to carry the data between CDPD subscribers. Only the frequencies are shared with the primary cellular telephone exchange.

A disadvantage of the CDPD approach is that it is costly to build and maintain a separate cellular network, including separate base stations, throughout a service region, in order to utilize the short-duration periods of idle spectrum. Another drawback of CDPD is that it is incompatible with timedivision multiplexing because it searches for blank periods in the broadcast spectrum. CDPD cannot identify gaps between individual cellular calls when several calls are being carried on the same carrier frequency. With time-division multiplexing, a transceiver will fall idle only if all the cellular channels carried by the transceiver are idle, a condition which rarely occurs. CDPD only works well with analog cellular systems where each channel is carried on a separate transceiver and the transceiver briefly falls idle at the end of every call. Because CDPD is limited to use with analog cellular systems, it is incompatible with the direction of the growth in cellular telecommunications.

It would be advantageous to be able to make use of the idle periods between cellular calls for telecommunications purposes without building a duplicate infrastructure of cellular base stations and transceivers.

It would also be advantageous to be able to increase the utilization of the available radio spectrum by transferring data packets between digital users over the same base stations and transceivers used by voice or speech callers in a conventional cellular telephone network.

It would also be advantageous to increase the use of each transceiver in a cellular base station without interfering with the handling of the primary cellular calls ordinarily handled by the transceiver.

Moreover, it would be advantageous to increase the utilization of cellular base stations on a primary cellular telecommunications network by providing a separate cellular data network which employs some or all of the same base stations and transceivers used by the primary network and which transmits and receives data calls only during the intervals between the primary network calls, thereby increasing the capacity of the system to handle calls without requiring more base stations, transceivers, or radio frequencies.

Accordingly, the present invention provides a system for increasing the utilization of cellular base stations in a telecommunications system of the type which includes a first cellular network having one or more cellular telephone exchanges operatively connected to a plurality of cellular base stations located throughout a service region. Each of the base stations in the first cellular network transmits and receives radio signals over a limited area at selected, predetermined frequencies to provide a plurality of cellular channels which carry first network calls to and from mobile cellular telephones. The first cellular network also includes a cellular channel monitor for determining when, at each base station, a first network call has ended and when, during each interval between first network calls, a cellular channel is available to carry a new first network call.

The system of the present invention comprises a cellular data network which is operatively connected to and shares at least some base stations connected to the first cellular network. The cellular data network is also selectively connected to a public packet data network and carries cellular data calls to and from mobile cellular stations. The cellular data network includes a cellular data telephone exchange operatively connected to one or more of the cellular based stations used by the first cellular network. The base stations which are shared between the first cellular network and the cellular data network, and which carry both first network cellular calls and cellular data calls, are referred to as shared base stations.

A data call controller is provided in each such shared base station. The data call controller is operatively connected to the channel monitor for the first cellular network and monitors the status of all data calls being handled by the base station. It also selectively directs data calls intermittently to available cellular channels during the intervals between first network calls. The result is that the shared base stations selectively sends and receive both first network calls and cellular data network calls.

In its preferred form, the system of the present invention also provides a data buffer in each shared base station. The data buffer is operatively connected to the data call controller at the base station and serves to receive and temporarily store data from the data calls which arrive at the base station via the cellular data telephone exchange. The data buffer works with the data call controller so that selected data is retrieved from the buffer and directed to an available cellular channel at the base station during selected intervals between first network calls.

Also provided in each shared base station is a data call inserter which is operatively connected to the data call controller. The data call inserter establishes intermittent operative connections between the buffer and selected ones of the plurality of cellular transceivers in each base station. The intermittent operative connection is used when a data packet is sent from the buffer to the transceiver during an interval between first network calls.

The system of the present invention also works with first cellular networks of the type which provide multiple cellular channels on selected predetermined cellular frequencies through use of time division multiplexing. In such systems, each transceiver in one of the shared base stations carries a plurality of cellular channels in different predetermined time slots. To access those time slots, the data call inserter is operatively connected to the data call controller in the base station, and is also connected to a timeslot monitor in the base station, such that data packets retrieved from the buffer at the base station can be inserted into the correct time slot for whichever cellular channel is available. The data packets are inserted into a cellular channel during intervals between the first network calls being carried on that channel.

The invention further provides a method of sharing cellular channels in a cellular telecommunications system of the type which includes a first cellular network, designed for predominately voice communications, operatively connected to a plurality of base stations, each transmitting and receiving radio signals over a limited area at selected, predetermined frequencies. The radio signals provide a plurality of first network cellular channels which carry first network calls to and from mobile cellular telephones. The method of the present invention comprises steps which include sharing at least some of the base stations connected to the first network with a second cellular data network designed to provide selective cellular telecommunications between a public packet data network and one or more of the data network's subscribers equipped with mobile cellular stations. The sharing step also includes operatively connecting each of the shared base stations with the cellular data network. Another step in the method is the transmitting and receiving of data packets from cellular data calls over selected first network cellular channels at each shared base station. The data packets are transmitted and received during intervals between first network calls, thereby providing intermittent cellular data channels which carry cellular data calls using the same predetermined frequencies and the same first network cellular channels used by the first cellular network.

In its preferred embodiment, each shared base station used in the method of the present invention includes a plurality of cellular transceivers for transmitting and receiving radio signals to carry the first network cellular channels. An additional step in the method includes temporarily storing in a data buffer data packets for each cellular data call arriving at the base station. The method also includes, for each cellular data call, storing one or more of the data packets until a selected interval between first network calls occurs on a first network cellular channel, and then retrieving and transmitting the stored data packets on the first network channel during selected intervals between such first network calls.

The method also can be used with first cellular networks which employ time division multiplexing to provide multiple first network cellular channels on one or more selected, predetermined cellular frequencies. In such a network, the step of transmitting and receiving data packets from cellular data calls also includes, for each first network cellular channel, inserting the data packet into the timeslot of the cellular channel being used to carry the first network call.

The method of the invention increases the utilization cellular base stations by providing a plurality of data communications channels during intervals between first network calls. As such, the method establishes a plurality of intermittent virtual connections between subscribers without using additional duplicative base stations, base transceivers, or radio frequencies.

DETAILED DESCRIPTION OF THE PREFERRED EMBODIMENT

Figure 1:
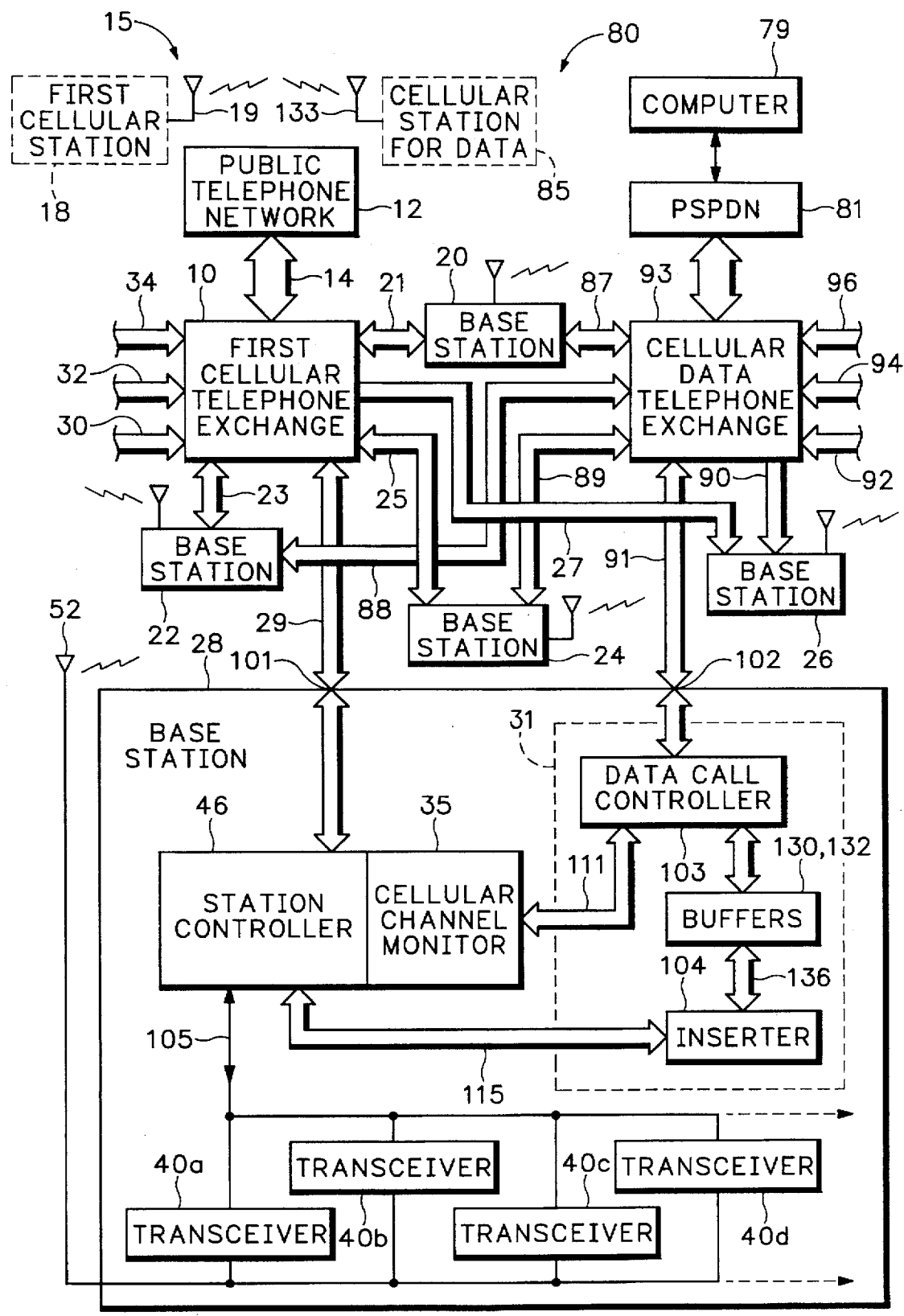
FIG. 1 is a block diagram of a telecommunications system which includes a primary cellular network and a cellular data network in accordance with the present invention.

FIG. 1 illustrates a telecommunications system which includes a first cellular network designed to provide selective radio connections between a public telephone network and a plurality of mobile cellular telephones. The first cellular network is designed for predominately voice or speech communications, although it may also be used for data communications by employing modems or similar devices. At the heart of the first cellular network is first cellular telephone exchange 10, which is a conventional cellular telephone exchange for selectively switching calls between a plurality of cellular base stations and a public telephone network 12. Exchange 10 is also referred to as a first land-based telephone exchange. A suitable operative trunk-line connection 14 links exchange 10 to a public telephone network 12. Public telephone network 12 is a conventional regional utility network which selectively switches and completes telephone calls simultaneously between a multitude of users. First cellular network is indicated generally by arrow 15 in FIG. 1.

Box 18 in FIG. 1 is a schematic representation of a first cellular station, i.e., a cellular telephone, designed for radio communication over first network 15 via cellular exchange 10, in the manner well known to those skilled in the art. In general, a cellular network will have many subscribers, each of which possesses a cellular station 18. Although only a single cellular station is shown in FIG. 1, it represents a large number of similar stations designed to communicate over first network 15.

Each cellular station 18 communicates by radio with one of a plurality of the cellular base stations connected to first network exchange 10. FIG. 1 shows plurality of base stations 20, 22, 24, 26 and 28 connected to first network exchange 10 by land-based trunk lines 21, 23, 25, 27 and 29, respectively. The trunk lines may alternatively be microwave or other suitable multi-line communications links. The base stations 20 22, 24, 26, and 28 shown in FIG. 1 are representative of a large number of base stations connected to first network exchange 10. Terminated connection lines 30, 32, 34 in FIG. 1 are included to illustrate that numerous additional base stations (not shown) are also connected to first network exchange 10. As will be appreciated by those skilled in the art, the number of base stations connected to a typical cellular network exchange depends on the size of the service area, its topography, and numerous other factors. A cellular network will usually include a large number of base stations, up to several hundred or more in very large networks. For the purposes of describing the present invention, base stations 20, 22, 24, 26, 28, and the suggested additional stations connected to lines 30, 32 and 34, serve to illustrate the principal elements of an entire regional cellular telephone network.

Figure 3:
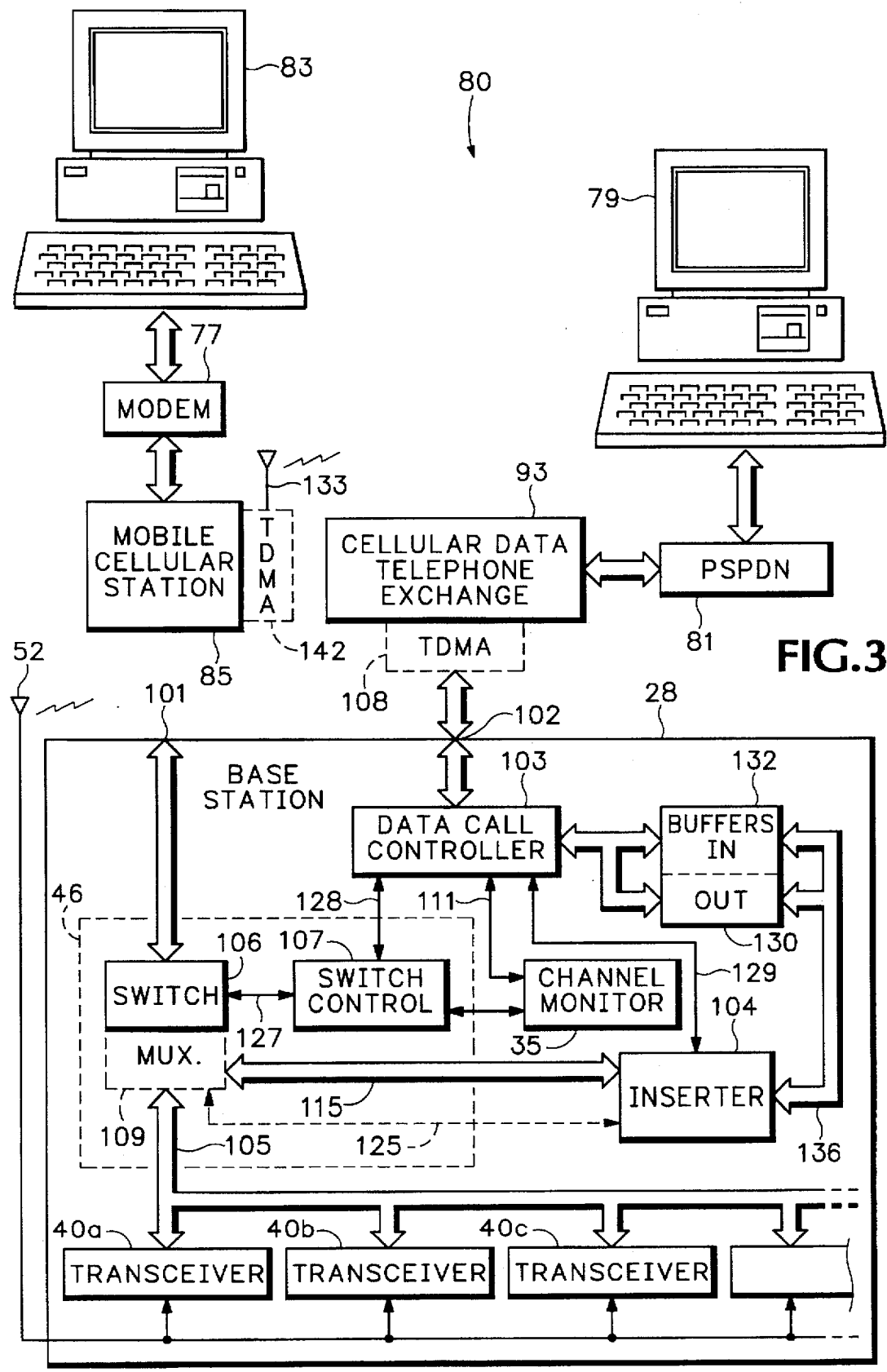
FIG. 3 is a block diagram illustrating a portion of the cellular data network shown in FIG. 1 and also showing additional elements of a shared cellular base station used by both the first cellular network and the cellular data network.

Cellular telephone exchange 10 is a well-known feature prior art cellular telephone networks. The function of a cellular telephone exchange is to receive calls from public network 12 and direct calls throughout the cellular network, including directing calls to the correct base stations and assigning calls to available cellular channels. The exchange also controls the assignment and reassignment of cellular calls throughout the network. A key element of any cellular network is the cellular channel monitoring system which monitors the status of all the cellular channels in the network so the system knows when a channel is free and can be assigned a new call. The cellular channel monitor can reside in the base stations, or in the exchange, or elsewhere, but the exchange must ultimately receive and process channel availability information in order to assign calls to available channels. Availability information is provided in network 15 by what is referred to as a cellular channel monitor (illustrated schematically at 35 in FIGS. 1 and 3 for one representative base station), which monitors the status of calls on each cellular channel and communicates with telephone exchange 10 whenever a channel is available to receive a new first network call. Many cellular networks locate the channel monitoring circuitry at each base station to monitor the channels handled through the base station, as shown in FIGS. 1 and 3. Other cellular networks may locate the channel monitoring function for all the base stations on the network at the telephone exchange 10. What is important is that the cellular network telephone exchange is provided with information about each first network call, about when a call has ended and when each cellular channel is free and available to carry a new first network call. Cellular channel monitor 35 in FIGS. 1 and 3 schematically represent the cellular channel monitoring function in network 15, regardless of where the actual monitoring device or devices reside.

FIG. 1 shows a single cellular telephone exchange 10 in network 15 connected to all the illustrated base stations. The first cellular network also may include more than one cellular telephone exchange 10 if the network or region is sufficiently large or has a large number of subscribers. In networks with a plurality of cellular telephone exchanges each connected to some of the network's base stations, the various exchanges are operationally linked and can be considered as part of a unitary, linked system. The schematic representation of box 10 in FIG. 1 in intended to encompass single or operationally linked plural cellular telephone exchanges of any suitable type used on network 15.

The cellular exchange and base stations used in first cellular network 15, except for the elements located within dashed-line box 29 of FIG. 1, are conventional and are commercially available from several manufacturers. For example, Motorola offers a cellular base station, referred to as a base site controller ("BSC"), as part of its multichannel radio equipment used with the Electronic Mobile Exchange ("EMX") package, marketed under the name EMX 100 Plus and EMX 250, 500, and 2500, available from Motorola, Radio-Telephone Systems Group, 1501 W. Shure Drive, Arlington Heights, Ill. 60004. Another example of a base station of the type used with the first cellular network of FIG. 1 is the "AUTOPLEX System 1000," manufactured by AT&T Networks Systems. Another example is the base stations used with Northern Telecom's DMS MTX System, available through Northern Telecom, Richardson, Tex.

Base station 28 in FIG. 1 is a representative base station used by network 15 and by the system of the present invention. The portions of base station 28 outside dashed-line box 31 are conventional elements of prior art cellular base stations. The elements within box 31 are associated with the system and method of the present invention, which will be described in greater detail below, particularly with reference FIG. 3. Each base station connected to network exchange 10 broadcasts and receives radio signals over a limited coverage area or "cell" using a plurality of low power transceivers 40, of which four are illustrated in FIG. 1, namely, transceivers 40a, 40b, 40c and 40d. Most cellular base stations contain 100 or more transceivers (not shown). Each transceiver is tuned to a selected, predetermined pair of transmit/receive frequencies used to simultaneously send and receive wireless signals to subscriber cellular telephones 18 located within the range of the base station. The transceivers thereby each handle one or more separate cellular channels. All the transceivers send and receive signals through the station antenna illustrated schematically at 52.

The transceivers 40 in base station 28 are operatively connected to and controlled by a base station controller 46. The base station controller is a well-known element of prior art cellular base stations. One of its principal functions is to switch each call and each request-for-service to an available transceiver. It also communicates with the cellular exchange and allows the exchange to monitor and direct call assignments.

One or more of the transceivers in each base station is usually assigned to monitoring requests for service from nearby mobile cellular telephones. A subscriber seeking to initiate a call from a cellular telephone will switch on the telephone, causing a signal requesting a channel to be transmitted to the nearest base station. The "request for service" signal is received at the base station and the station controller 46 assigns the call to an available transceiver 40. The station controller also sends instructions to the subscriber's cellular telephone to tune to the appropriate pair of frequencies used by the transceiver assigned to handle the call. Incoming calls from first network exchange 10 to base station 28 are also switched by controller 46 to an available transceiver 40. When an incoming call from exchange 10 arrives at base station 28, whether it is a hand-off from an adjacent base station or newly-initiated call, controller 46 assigns the call to an available transceiver 40 and sends instructions to the mobile cellular telephone to switch to the frequencies of the assigned transceiver.

As used herein, the term "cellular channel" refers to a two-way wireless channel capable of carrying an independent cellular call. In analog cellular systems, each cellular channel is handled by a separate transceiver. The transceiver transmits and receives continuous analog radio signals at predetermined frequencies assigned to the particular base station transceiver. In a digital cellular telephone system, each transceiver carries a plurality of cellular channels simultaneously using time division multiplexing or another multiplexing method such as code division multiple access ("CDMA"). Thus, in analog systems, each transceiver is able to handle a single cellular channel and in digital systems a single transceiver will handle multiple cellular channels.

Figure 2:
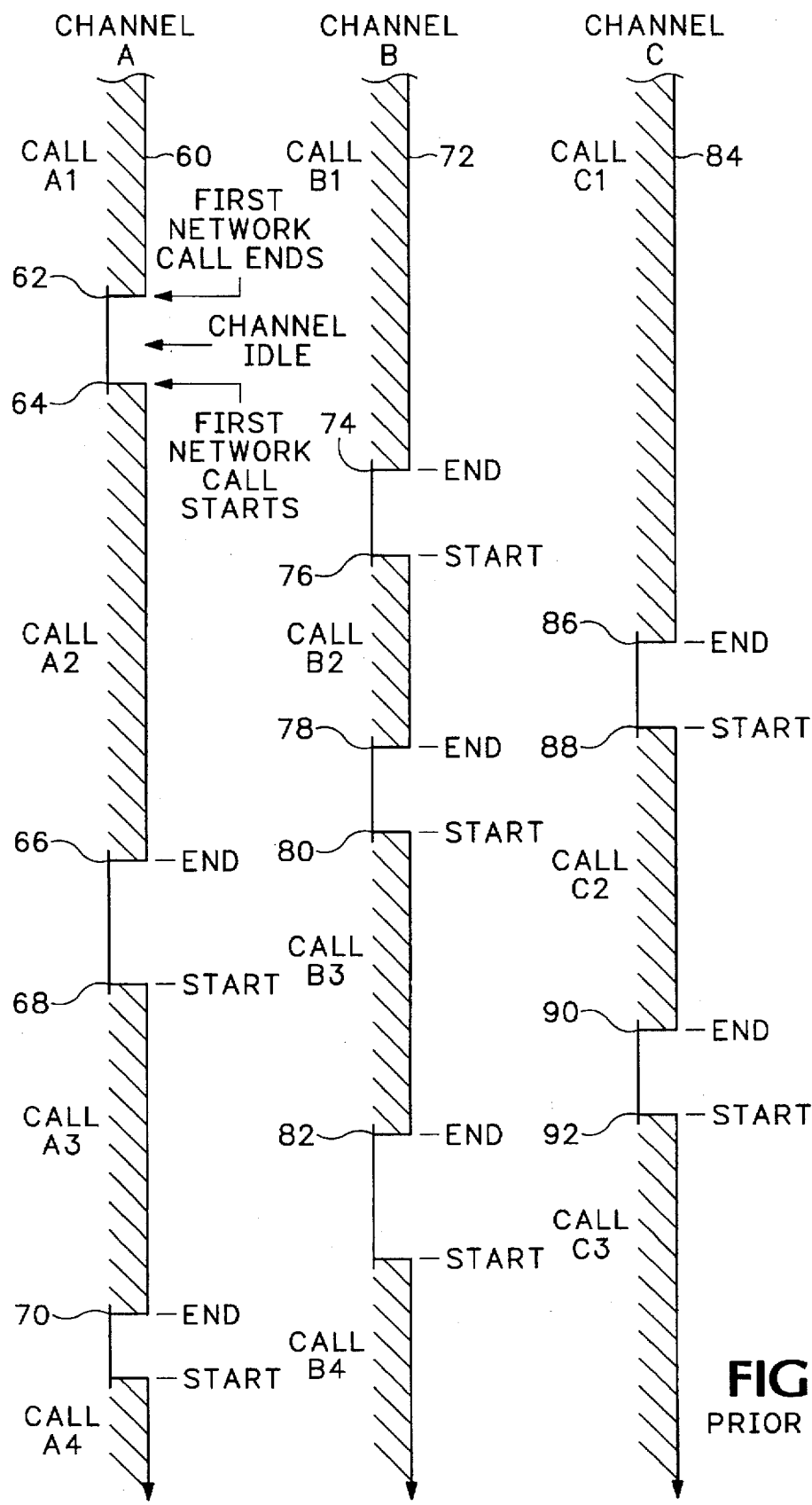
FIG. 2 is a timing diagram showing how calls on a primary cellular network designed for handling voice or speech calls are carried simultaneously on three representative cellular channels (prior art).

FIG. 2 is a timeline diagram illustrating three cellular channels in representative base station 28 simultaneously carrying a series of first network calls. The sequence and duration of the illustrated calls are representative of actual calls carried by one or more transceivers in a prior art cellular base station. Three vertical timelines are used to show sequential calls carried by three separate cellular channels, referred to as channels A, B, and C. The three cellular channels may be analog channels, each carded by a separate transceiver 40 in base station 28, or they may be digital cellular channels carried simultaneously by one or more transceivers using a suitable multiplexing methodology. Each channel is capable of carrying a separate cellular telephone call. The sequence of calls show in FIG. 2 is illustrative of a prior art cellular network and is provided as background for a description of the operation of the data cellular network of the present invention.

Starting with channel A, on the upper left side of FIG. 2, timeline 60 begins while channel A is in use carrying a call designated A1. During call A1, the transceiver carrying channel A is sending and receiving signals to and from a subscriber's cellular telephone via the transceiver's assigned frequencies. First network call A1 is terminated on timeline 60 at time 62. Termination occurs when the subscriber voluntarily ends the call, or when the call is automatically transferred to another cellular base station as the subscriber's cellular telephone moves out of range of base station 28.

The next call on timeline 60 is call A2, which starts at time 64. The interval between the end of call A1, at 62, and the beginning of call A2, at 64, is an idle period during which channel A is not in use. A new call is assigned to channel A either by the cellular telephone exchange 10 or by the base station controller 46, depending on the architecture of the first cellular network. The call is assigned to channel A because that channel happens to be immediately available to carry a new first network call. In FIG. 2, channel A becomes available at time 62 when call A1 ends. The idle period on channel A1, between time 62 when call A1 ends and time 64 when call A2 begins, will last several seconds if the network is carrying a typical call load. The idle period between first network calls is necessitated by the need to send a message from the base station to the cellular network exchange advising of the availability of a channel, coupled with the time it takes to switch a new call to the available channel. When the network is lightly loaded and incoming calls are infrequent, a transceiver may be idle for an indefinite period while awaiting assignment of a new call.

Continuing down timeline 60, call A2 terminates at time 66 and the channel is idle until time 68, when call A3 is initiated. Call A3 terminates at 70. Each of these calls is originated and assigned to channel A in the same manner as call A1 described above. Subsequent calls on channel A continue sequentially in this manner beyond the range of FIG. 2.

Timeline 72 shows calls carried by channel B, which is a separate telecommunications channel from channel A capable of carrying a separate two-way telephone call. Channels A and B could be carried on separate transceivers or they could be carded on the same transceiver, if signal multiplexing is employed. The calls on channel B are originated and assigned to channel B in the same manner as the calls on channel A described above. The first call on channel B is designated B1. Call B1 terminates at time 74, and channel B falls idle. The next call, B2, begins at 76 and ends at 78. The next call, B3, begins at 80 and ends at 82. The illustrated timeline for channel B ends during call B4.

Similarly, timeline 84 shows calls carried on channel C. The first call is designated C1. Call C1 terminates at 86 when channel C falls idle. The next call, C2, begins at 88 and ends at 90. The next call, C3, begins at 92 and continues beyond the range of FIG. 2.

Although FIG. 2 illustrates only three cellular channels handled by base station 28, it should be understood that numerous cellular channels, up to several hundred or more, may be handled by the base station. If, for example, the base station is part of an analog cellular network and includes 100 transceivers, up to 100 separate cellular channels will be available. If the base station is part of a digital cellular system employing time division multiplexing, the number of available cellular channels will be several times greater. A brief description of one cellular broadcast standard which provides time division multiplexing, known as Time Division Multiple Access ("TDMA") will illustrate the concept.

Using the TDMA standard, sequential message frames are transmitted by each transceiver, along with appropriate synchronization codes. Each digitized message frame is 40 ms in duration, and configured as follows:

|  | 40 ms | | | | | |
| --- | --- | --- | --- | --- | --- | --- |
|  | Channels | | | Channels | | |
|  | X | Y | Z | X | Y | Z |
| T/Slots | 0 | 1 | 2 | 3 | 4 | 5 |

TDMA Frame

Three separate cellular channels designated X, Y, Z above, are carried by a single transceiver in six different time slots ("T/Slots"). The six timeslots are each 6.67 ms in duration. Timeslots 0 and 3 carry cellular channel X, timeslots 1 and 4 carry channel Y, and timeslots 2 and 5 carry channel Z. Digitized cellular calls are transmitted and received in their respective assigned time slots. The TDMA standard contemplates an eventual switch to carrying six separate channels in the six timeslots. During normal operation, the cellular transceiver in base station 28, if it is carrying calls using the TDMA format, will remain on as long as a call is being carried on at least one of the three channels. When one of the channels falls idle, such as at time 62 on channel A, no message is transmitted in its assigned timeslot until a new call begins to be carried by that cellular channel.

The present invention provides a system and method for increasing the utilization of base stations in a primary cellular network by using the base station transceivers and cellular channels to carry digital information in the form of data packets during the idle periods (or intervals) between first network calls. In FIG. 1, the primary network is first cellular network 15. The present invention provides a second cellular data network 80, shown generally on the right side of FIG. 1. Network 80 is intended to be used as part of a public packet data network, also known as a public switched packet data network ("PSPDN") 81. PSPDN 81 is a public telephone exchange for data-only calls. It provides users with a low-cost alternative to using the public telephone network for data calls. The efficiency of a PSPDN derives from its packetizing of data calls into short-duration data packets which can be sent in brief intermittent bursts over the public network or dedicated PSPDN lines. As the term is used herein, data packets consist of short-duration bursts of digital information that has been encoded and can be decoded in accordance with a predetermined protocol. The data packets are able to transfer large quantities of information over communication lines at minimal cost.

Cellular data network 80 is designed to carry data calls between computers or the like, preferably in the form of data packets, also referred to as packet data. A computer 79 can communicate with mother computer 83, which is accessible via cellular network 80 by dialing its address code or access number through PSPDN 81. The PSPDN then connects computer 79 to a cellular data telephone exchange 93, which is part of the cellular data network 80 of the present invention. Data network exchange 93 serves the same function in network 80 as exchange 10 does in network 15. Exchange 93 is connected to one or more of the cellular base stations used by first cellular network 15. In FIG. 1, base stations 20, 22, 24, 26, 28 are illustrated as connected to exchange 93 via land-line, microwave, or similar connections 87, 88, 89, 90, and 91, respectively. Those base stations are also connected to and shared with first network exchange 10. Exchange 93 may also be connected to other base stations (not shown), as indicated by terminated connection lines 92, 94, 96. The additional base stations connected to lines 92, 94, 96 may be the same base stations connected to first network exchange 10 by lines 30, 32, 34, or they may be different base stations not connected to first network exchange 10.

Like first cellular network 15, the number of base stations to which cellular data telephone exchange 93 is connected depends on the size, topography, number of customers, and other characteristics of the region served by the cellular data network 80. The cellular data network may, for example, serve the same region as first cellular network, or it may be larger or smaller. The present invention contemplates sharing some, if not all, of the base stations between the two cellular networks. For example, base stations 20, 22, 24, 26 and 28 are shared base stations. Cellular data network 80 could alternatively be configured to partially overlap one or more adjacent primary cellular networks (like first network 15), and could share some base stations with each network. Regardless of configuration of the second cellular data network 80, base station 28 is assumed to be a shared base station used by both networks.

FIGS. 1 and 3 show the various elements of cellular data network 80 and of shared base station 28. First network calls from first network exchange 10 arrive at base station 28 through a first port 101. The first network calls are directed to base station controller 46. Station controller 46 includes a switch 106, which switches the multiple parallel circuits carrying calls to and from cellular telephone exchange 10 between the various base station transceivers 40. Switch 106 is operatively connected to and controlled by a switch control 107. Switch control 107 is in turn controlled by cellular telephone exchange 10 which directs the transceiver interconnections needed to complete first network calls. Individual calls are assigned to a selected transceiver based on it having a cellular channel which is idle and available to carry the call. If the first cellular network employs time division multiplexing, calls will be time division encoded at the cellular telephone exchange, as indicated by dashed line box 108, or, alternatively, at the base station, as indicated by dashed line box 109. Box 108 is depicted in FIG. 3 with the letters TDMA, referring to Time Division Multiple Access, although other suitable digital encoding protocols may be used within the scope of the present invention.

Box 109 in base station 28 is identified as a multiplexer ("Mux.") and serves several functions in networks employing digitized multiplexing schemes such as TDMA. Multiplexer 109 is a timeslot monitor which functions integrally with switch 106 to insure that first network calls are inserted into and extracted from the correct timeslots for the channel assigned to carry each call. Multiplexer 109 is alternatively referred to as a time slot controller. It also may include circuitry for encoding and decoding calls before they are sent or received by transceivers 40, although the usual location for the encoding/decoding function is at each transceiver in the base station. For simplicity, separate multiplexers have not been shown in each transceiver box 40 in FIGS. 1 and 3, although it will be understood by those skilled in the art that, in networks employing digital multiplexing, multi-channel encoding and decoding is usually performed at each transceiver. The function served by box 109 is to provide call multiplexing for all calls passing through base station 28, and also to serve as a timeslot monitor for all cellular channels handled by base station 28. The physical location of the encoding/decoding circuitry may be at any suitable location within the base station.

Cellular data network calls from cellular data telephone exchange 93 arrive at the base station through a second port 102 and are directed to a second controller, referred to as data call controller 103. The function of data call controller 103 is to direct the temporary storage of second network call information (i.e., incoming data packets) until a cellular channel becomes available, to release the information at the correct time, and to direct the call to the correct channel and transceiver. Data call controller 103 is operatively connected to switch control 107 of base station controller 46. Data call controller 103 is also operatively connected to the cellular channel monitor 35 via line 111. Channel monitor 35 provides information about when a first network call was ended and when, during each interval between first network calls, a cellular channel is available to carry a new first network call. Data call controller 103 is also operatively connected to data buffers 130, 132. Data buffer 130 receives and temporarily stores data packets from data calls arriving at the base station from PSPDN 81 via cellular data telephone exchange 93. Finally, an inserter-extractor 104, also referred to herein as inserter 104, is operatively connected to the transceiver switch 106 by data call inserter/extractor line 115. The inserter is a switching device which briefly connects line 136 from data buffers 130, 132 to switch 106 in base station controller 46. Switch 106 and inserter 104 selectively insert data packets into and extract data packets from the transceiver call bus 105, which carries first network calls to and from the base station transceivers 40. When a brief connection is completed between buffers 130, 132 and switch 106 via inserter 104, data packets can be sent to and from a selected transceiver 40. The operation of inserter 104 is controlled by data call controller 103 via line 129 based on channel availability information applied by base station controller 46 via line 128. Inserter 104 injects and retrieves data from switch 106.

In cellular networks employing call multiplexing such as TDMA inserter 104 is operated in coordination with multiplexer 109 through switch 106 so that data packets sent to and from buffers 130, 132 are correctly assigned to the time slot of the available cellular channel assigned to carry the data call.

A representation of a mobile cellular station, also called a mobile subscriber unit for the cellular data network, is illustrated schematically in FIG. 3. Mobile cellular station 85 is a cellular telephone designed to transmit and receive data calls from a subscriber's computer 80. Station 85 may, in fact, be a cellular telephone connected to a suitable modem 77, or it may be a dedicated unit for data calls only. If used on a cellular data network which employs time division multiplexing, a suitable TDMA encoder/decoder 142, or another type of multiplexer compatible with the system used in network 80, may be included with mobile cellular station 85. The TDMA unit is depicted as a dashed line box in FIG. 3. Data from subscriber computer 83 is transmitted and received through mobile cellular station 85 via station antenna 133.

The following description of the operation of cellular data network 80 assumes that first cellular network 15 is an analog cellular network in which each transceiver in each base station carries a single two-way telephone call. A data call on the cellular data network is originated, in this example, by the user of computer 79 directing a data call to mobile computer 83. The user enters the appropriate address code for mobile cellular station 85, and the data call is directed through PSPDN 81 to cellular network exchange 93, which seeks and locates mobile station 85 within range of base station 28. The call is completed once the data path between land-based computer 79 and mobile computer 83 is established via base station 28. The actual flow of data over network 80 is intermittent, but the data telephone exchange 93 tracks the intermittent connection through network 80. As data flows from computer 79 toward computer 83, it first passes through PSPDN 81 where it is packetized. The data packets are then directed to data telephone network exchange 93 where it is directed to base station 28. Each data packet arrives at base station 28 through input port 102. It is stored in buffer 130 until a cellular channel becomes available during an interval between the first network calls which are also being carried by the base station.

Base station controller 46 monitors all the cellular channels of first network 15 until channel monitor 35 indicates the termination of a first network call, at which time a cellular channel becomes briefly available to carry a data call. During the interval between the termination of one first network call on a cellular channel and the time when a new first network call is assigned to the channel, there is a delay of several seconds. It takes the first cellular network that long to identify the open cellular channel, to communicate the channel availability to cellular telephone exchange 10, and to direct a new first network call to the base station where it will be switched to whichever transceiver 40 is available. Before the new first network call is assigned to the transceiver, data call controller 103 signals buffer 130 via line 131 to retrieve the stored data packet from buffer 130 and directs it to the available transceiver through inserter 104. The inserter 104 briefly connects line 136 from buffer 130 to switch 106. Data call controller 103 also directs the transceiver to briefly turn on and transmit the data packet to mobile cellular station 85 via station antenna 52. The circuitry used to instruct a transceiver to briefly transmit the data packet may reside at the selected transceiver itself, or elsewhere. Once the data packets are transmitted, mobile cellular station 85 receives the data packet via antenna 133 and directs it to subscriber mobile computer 83. Simultaneously, with the foregoing, assuming that a two-way exchange of data is taking place, a data packet moves in the other direction through the cellular data network from computer 83 to computer 79.

A data call originating from mobile computer 83 will pass first to mobile cellular station 85, which will broadcast a request-for-service signal via antenna 133 to the cellular data network. Assuming base station 28 is the closest station, antenna 52 will receive the request-for-service call on the appropriate channel reserved for that purpose. The message will be directed to the logic circuitry which assigns a transceiver to handle the call, either within base station 28 or at the cellular telephone exchange 10. An available transceiver will then be assigned to handle the call. Mobile cellular station 85 is directed to tune to the appropriate send/receive frequencies for that transceiver. The data call will not be assigned to a transceiver until a cellular channel is available to carry the data call. A channel is identified by transceiver control circuitry for controlling the operation of the transceivers usually located in base station controller 46, and by cellular channel monitor 35, which identifies each interval between first network calls. When an interval is detected on a transceiver, that transceiver is briefly turned on and instructed to receive a data packet from mobile cellular station 85. Instructions are sent to the mobile cellular station to tune to the transceiver's send/receive frequencies, and a data packet will be transferred to the assigned transceiver via base station antenna 52. Inserter 104 briefly connects the transceiver to buffer 132 via line 136. As soon as one or more data packets have been extracted, inserter 104 returns the connection in switch 106 to its "normal" position where it is ready to handle the next first network call.

Buffer 132 is the input buffer for base station 28 where incoming data packets from mobile subscribers are briefly stored. Buffer 132 is optional since there will generally be a land-line or other connection between base station 28 and computer 79 via cellular data telephone exchange 93 and PSPDN 81. In other words, data packets arriving at base station 28 via antenna 52 can usually be immediately transferred to receiving computer 79. It may, however, be desirable to have an incoming data buffer 132 to synchronize the exchange of data packets that are moved in and out of the base station.

If the first cellular network uses time division multiplexing, each cellular channel is accessed by addressing both a selected transceiver and a time slot corresponding to the available channel. In FIG. 3, switch 106 includes a multiplexer 109 which functions integrally with switch 106 in cellular systems employing time division multiplexing. Multiplexer 109 functions as a timeslot monitor device in base station 28 which monitors the multiplexed channels handled by each transceiver 40. As part of the base station controller 46, multiplexer 109 insures that first network calls are inserted in the correct timeslot for the cellular channel to which the call is assigned. Multiplexer 109 also provides a multiplex synchronization function within switch 106 for data calls handled by data call controller 103. A dashed line 125 in FIG. 3 illustrates an operative connection provided between inserter 104 and multiplexer 109 indicating that the inserter is operated in coordination with multiplexer 109 to insure that data calls are assigned to the correct timeslot for the cellular channel in which the data call is being inserted. The actual connection represented by line 125 may, in fact, be a connection between data call controller 103, switch control 107 and switch 106, as well as the connection illustrated by line 129 between data call controller 103 and inserter 104. The function of the operative connection 125, regardless of its actual configuration, is to insure that data calls are assigned to the correct timeslot for the channel to which the call is assigned.

In a time division multiplexing network, each mobile cellular station 85 will also include its own TDMA or other compatible multiplexer decoder/encoder 142 synchronized with the network multiplexer decoder/encoder to insure that each data packet is correctly recovered for transfer to computer 79. In FIG. 3, TDMA box 142 is illustrated with dashed lines to indicate that it is only used with digital cellular networks employing call multiplexing.

Figure 4:
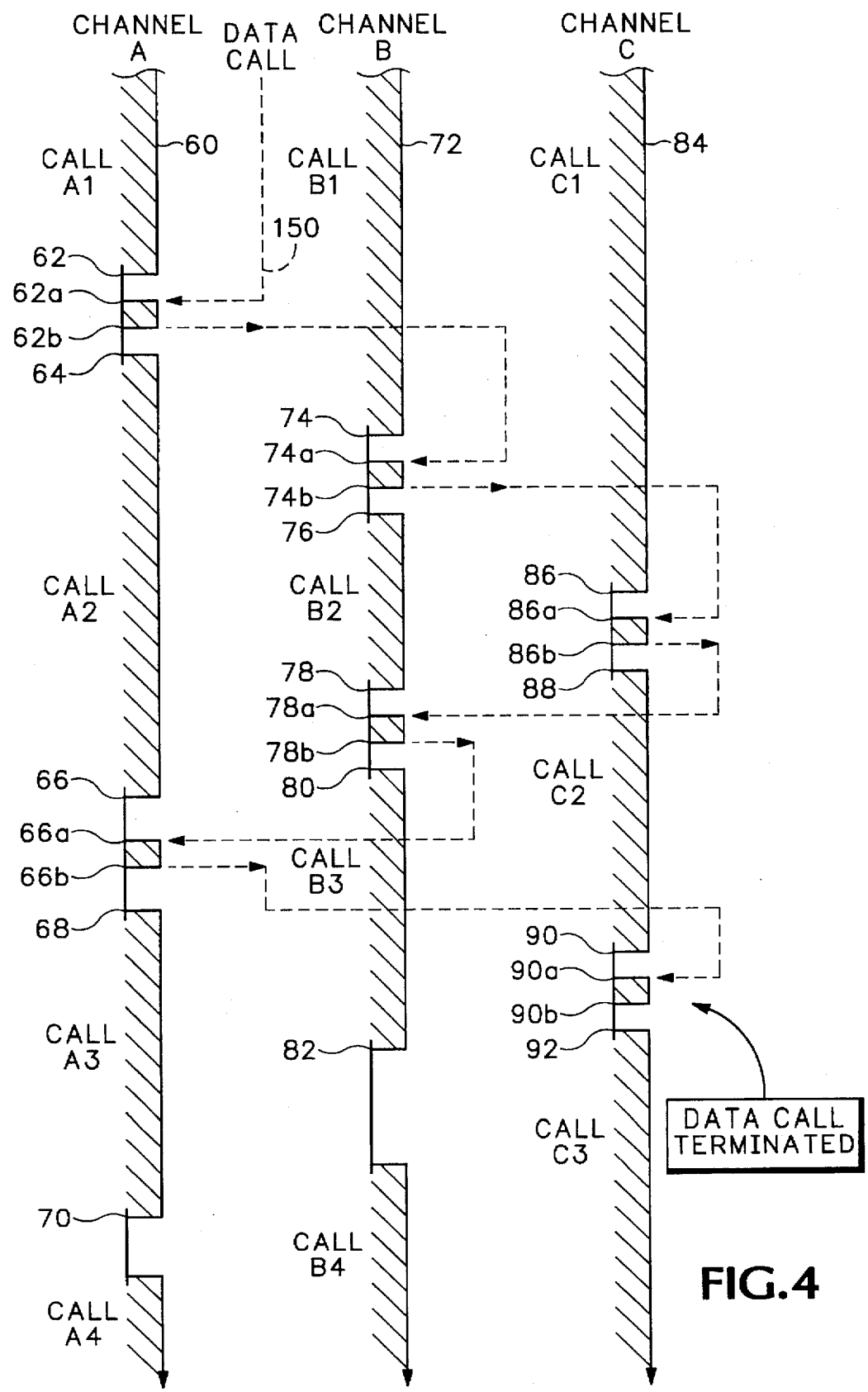
FIG. 4 is a timing diagram as in FIG. 2 illustrating how a second network data call is carried without interfering with the first network calls shown in FIG. 2.

FIG. 4 illustrates how a single second network data call is carried intermittently by three different cellular channels without interfering with first network calls. The first network calls illustrated are the ones which were previously shown and described with reference to FIG. 2. A representative data call 150 is shown as a series of discrete, intermittent exchanges over three different first cellular network channels, A, B, and C. The data call does not interfere with the first network calls A1, A2, A3, B1, B2, B3, C1, and C2 which are also being carried by those same cellular channels. As noted above with reference to FIG. 2, cellular channels A, B, and C are representative first network channels which may be carried either by separate transceivers, as in an analog cellular network, or separate channels in a time division multiplexed network carried by the same or different transceivers.

At the top of FIG. 4, second network call 150, represented by a dashed line, is in a "hold" state waiting for a cellular channel to become available. While in the "hold" state, any data traveling from computer 79 to base station 28 will be accumulated in outgoing data buffered 130 until a channel becomes available. Any data traveling from computer 83 to the base station must be saved in a suitable buffer (not shown) in computer 83, or in mobile cellular station 85, until a channel becomes available. Data traveling between computers 79 and 83 will be exchanged intermittently, only when a channel becomes available.

In the example of FIG. 4, channel A becomes available upon the completion of call A1, at time 62. Between times 62 and 64 the channel would normally be idle. Base station controller 46 and channel monitor 35 will recognize the completion of call A1 at time 62 and send a message to data call controller 103 indicating that channel A is in an interval between first network calls. Controller 103 then directs input buffer 130 to retrieve a packet of accumulated data for call 150 and send it to the transceiver carrying channel A via line 136, inserter 104, switch 106, and bus 105. Channel A is briefly reactivated, as indicated on timeline 60 at time 62a, and a data packet is exchanged with computer 83.

At the conclusion of the brief interval beginning at time 62a, channel A will return to its idle status, at time 62b. The time interval between 62a and 62b should be less than 5 seconds and, preferably, less than approximately 2 seconds in duration. Such a time interval is shorter than the customary idle period between first network calls. One reason it takes less time for data call controller 103 to insert a brief data call into channel A than for first cellular network 15 to assign a first network call to channel A is the immediate proximity of the data packet stored in buffer 130 within base station 28 and the fact that it is instantly retrievable by controller 103. It takes longer for the base station controller 46 to inform the first network telephone exchange 10 about the availability of a channel because it must compose a message to exchange 10, await the assigning of a new first network call to the base station and then switch that call to the available channel. The difference in time is not great, but it is sufficient for data packets to be quickly exchanged without interfering with the handling of any first network calls. At 62b, after data packets have been transmitted and received as part of data call 150, the call is again put on "hold," at time 62b, until another channel becomes available.

The next available idle period in the three channels (A, B, C) shown in FIG. 4 begins at time 74 on channel B. At time 74, base station controller 46 (see FIG. 3) alerts data call controller 103, to the idle condition of channel B. Data call controller 103 retrieves the accumulated data packets associated with call 150 from output buffer 130 and directs it to the appropriate transceiver and time slot carrying channel B. The second exchange of data in call 150 occurs between times 74a and 74b. After the data packets have been sent and received, channel B becomes idle, at time 74b. Call 150 is again put on hold and data call controller 103 again instructs buffer 130 to accumulate additional incoming data packets associated with call 150 until another channel becomes available. In the example of FIG. 4, the next channel to become available is channel C, at time 86. At time 86a channel C is briefly reenergized, until time 86b. The third exchange of data in call 150 occurs between times 86a and 86b, when the data call is directed to channel C.

The above-described procedure is repeated for each subsequent exchange of data packets illustrated in FIG. 4. At time 78a, channel B is briefly reenergized, until time 78b. The fourth exchange of data in second network call 150 occurs between times 78a and 78b, when call 150 is directed to channel B. At time 66a channel A is briefly reenergized, until time 66b. The fifth exchange of data call 150 occurs between times 66a and 66b, when the data call is directed to channel A. At time 90a, channel C is briefly reenergized until time 90b. The sixth and final exchange of data packets in call 150 occurs between times 90a and 90b, when the data call is directed to channel C. In the example illustrated in FIG. 4, the data call 150 terminates with data packet 90a, on channel C.

The data packet controller 103, together with base station controller 46, can direct a data call to any of the transceivers 40 in base station 28 and to any time slot used by the time-division multiplexer. Multiple simultaneous data calls are handled by having the data packet controller and base station controller 46 track each call separately as it is directed through multiple cellular channels.

Since more than one data call may be passing through base station 28 at the same time, data call controller 103 will necessarily prioritize the use of the timeslots between first network calls as they become available. For example, the data call with the highest priority would most likely be the call which has been on "hold" the longest. In other words, the determination of priority will probably be based on a first-in, first-out methodology. Another factor in prioritizing the assignment of timeslots could be the amount of data accumulated in buffer 130. If, for example, a very active data call begins to overflow buffer 130, a signal will be sent by data call controller 103 to computer 79 instructing it to cease sending until the buffer has been cleared. An overflow condition in buffer 130 for any data call would also give that call priority for the next data transfer when an interval between first network calls occurs. Call priority could also be based on price where users pay for the level of service desired. In such a prioritizing method, calls paying the highest rate would receive the highest priority. These prioritizing options are examples of how multiple simultaneous data calls could be handled within a base station and alternative prioritizing schemes could also be used within the scope of the present invention.

Because each cellular data call is a series of discontinuous, intermittent data packet exchanges, the data cellular network will not be suitable for carrying high quality voice or analog communications, although it might carry very low quality voice calls. It is, however, ideal for a computer data link. Data calls between computers often have long intervals of inactivity which render a continuous connection unnecessary, expensive and wasteful. Instead, a data call carried as a series of data packets, exchanged at intervals of several seconds or more, will "look" to the users like a continuous call, establishing a "virtual" connection between the users.

The present invention also provides a method of sharing cellular channels in a cellular telecommunications system such as first cellular network 15 designed for predominantly voice or speech communications. Referring to FIG. 1, the method is carried out with a conventional cellular network operatively connected to a plurality of cellular base stations, such as base stations 20, 22, 24, 26, 28, and the additional base stations connected to lines 30, 32, and 34. The base stations each transmit and receive radio signals over a limited area at selected, predetermined frequencies to provide a plurality of first network cellular channels which carry first network calls to and from mobile cellular telephones 18. The method of the present invention includes the step of sharing at least some of the first network base stations with a cellular data network designed to provide selected, intermittent cellular communications. The shared base stations illustrated in FIGS. 1 and 3 include stations 20, 22, 24, 26, and 28. The cellular data network which shares those base stations is cellular data network 80, designed to provide cellular communications between a public packet data network and data network subscribers equipped with mobile cellular stations 85. The public packet data network in FIG. 1 is PSPDN 81. The sharing step is accomplished by the operative interconnection of cellular data telephone exchange 93 with shared base stations 22, 24, 26, and 28 via respective land-lines 87, 88, 89, 90, and 91.

The next step in the method is to transmit and receive data packets from cellular data calls at the shared base stations. The transmitting and receiving of data packets is carried out over selected first network cellular channels during intervals between first network calls, as is described above with reference to FIG. 4, using the circuitry in box 31 of FIG. 1. The method provides intermittent cellular data channels which carry cellular data calls using the same predetermined frequencies and the same first network cellular channels used by the first cellular network.

Additional steps in the preferred method of invention include directing the cellular data calls to selected ones of the plurality of cellular transceivers 40 provided in each of the shared base stations. The transceivers transmit and receive the radio signals which carry the first network cellular channels. If first cellular network transmits and receives analog signals, and each transceiver carries a single cellular channel, then the method includes directing selected cellular data calls to selected transceivers during intervals between first network calls. Those intervals are when the transceivers are idle and available to carry the data packets without interfering with first network calls. If the first cellular network employs time division multiplexing, the step of transmitting and receiving data packets from cellular data calls further includes, for each first network cellular channel, inserting the data packets into the correct timeslot for that cellular channel. This step is carried out by data call controller 103, switch control 107, timeslot multiplexer 109, and inserter 104 described in detail above with reference to FIG. 3.

The method also preferably includes the step of temporarily storing data packets from each cellular data call in a data buffer before the step of transmitting and receiving the data packets. With reference to FIG. 3, data packets from cellular data calls are stored in buffer 130 until a selected interval between first network calls occurs on one of the first network cellular channels. Then, a selected stored data packet is retrieved and transmitted on the first network channel during the interval.

The intermittent exchange of data between computers over the cellular data network establishes virtual connections, i.e., intermittent, discontinuous connections, as opposed to continuous connections, between users of the cellular data network. The method of the present invention also preferably includes the step of completing calls over the cellular data network in the form of discrete intermittent data packets transmitted and received between computers or other digital devices.

Alternative embodiments are possible within the scope of the present invention. for example, the system for providing time-division multiplexing described in connection with FIG. 3 is but one of several alternative multiplexing methodologies suitable for use with the invention. Code division multiple access ("CDMA") and other multiplexing schemes, well known to those skilled in the art, also provide multiple cellular channels on each cellular frequency with the individual channels being separately usable to send and receive cellular calls. Thus, while the foregoing description included specific references to time-division multiplexing, the invention may be used with primary cellular networks employing other types of digital multiplexing. If other multiplexing systems are used, certain elements illustrated in FIG. 3 will change slightly. If, for example, first cellular network 15 uses CDMA or another multiplexing methodology, data cellular network 80 must use the some or a compatible multiplexing methodology. Consequently, if another multiplexing scheme is used in network 15 of FIG. 1, dashed-line boxes 108 and 142 in FIG. 3, representing TDMA encoders/decoders at the central cellular telephone exchange 93 and the mobile cellular station 85, respectively, will be replaced by suitable multiplexer encoders/decoders of a type compatible with the first network. Similarly, multiplexer 109 in base station 28 will necessarily be a multiplex controller of the some type used by the first network. Regardless of the type of multiplexing methodology used by the cellular networks, the system of the present invention will insert data packets into the intervals between first network calls. Referring to FIG. 3, inserter 104 in representative shared base station 28, and in the other shared base stations of the present invention, will operate in coordination with the multiplex controller 109 in the base station, regardless of whether it is a time-division multiplex controller or another type of multiplex controller. In summary, when multiple access multiplexing methodology is used to define individual cellular channels in the primary cellular network, the data packets of the data cellular network must be inserted into the available multiplexed cellular channel, between first network calls, using a compatible multiplexing methodology. Other alternative embodiments within the scope of the present invention will occur to those skilled in the art.

The system and method of the present invention minimizes the duplication of elements needed to provide a data-only cellular communications network in areas where a primary cellular network is already in place. The cellular data network of the invention uses its own land-based data telephone exchange, but makes use of most or all of the same cellular base stations and transceivers used by the primary network. Consequently, a second data-only cellular network is provided without a substantial and duplicative investment in separate base stations and transceivers. Another benefit of the invention is that the second network does not require any additional radio spectrum.

What is claimed is:

1. In a cellular telecommunications system in which a predominately voice-carrying first cellular network includes one or more cellular telephone exchanges operatively connected to a plurality of cellular base stations located throughout a service region, each of the base stations including a plurality of first network transceivers which operate at one or more predetermined frequencies, the transceivers each providing at least one cellular channel which carries first network calls to and from mobile cellular telephones, including a base station channel monitor for determining, for each transceiver, when one first network call has ended and the channel is idle and available to carry another first network call, and including a base station controller operatively connected to the transceivers and the channel monitor, the base station controller directing incoming first network calls to idle channels, each cellular channel being at least briefly idle between the end of one first network call on the channel and the beginning of the next first network call, a system for using the base stations and transceivers of the first cellular network to carry packetized data comprising:

a cellular data network operatively connected to a plurality of base stations, said cellular data network sharing at least some base stations and transceivers with the first cellular network, said cellular data network being connected to a public packet data network and selectively transferring data packets between users of the public packet data network and mobile cellular data stations, each said shared base station which is shared by both the first cellular network and said cellular data network further including:

a first network communication link operatively connecting said shared base station and the first cellular network for carrying first network calls to and from the base station;

a second network communication link operatively connecting said shared base station and said cellular data network for carrying data packets to and from the base station;

an operative connection between said first network communication link and the base station controller of said shared base station for routing first network calls to and from the transceivers within the base station, the base station controller being also operatively connected to the base station channel monitor for identifying intervals between first network calls;

an operative connection between said second network communication link and the base station controller of said shared base station for routing data packets to and from the same transceivers within the base station used to carry the first network calls; and a data packet call controller operatively connected to the base station controller and said second network communication link for selectively supplying and retrieving data packets to and from the base station controller in response to the base station controller routing one or more data packets through a selected transceiver in said shared base station, said base station controller routing data packets through a selected transceiver during the intervals between first network calls on the cellular channel carried by the transceiver, whereby the transceivers and cellular channels used by said shared base station carry predominately voice calls over the first cellular network and intermittently carry data packets from the cellular data network over the same cellular channels and transceivers.

2. The system of claim 1 including, in each of said shared base stations, a data buffer operatively connected to said data packet call controller for receiving and temporarily storing data packets from the public packet data network, said data packet call controller responding to the base station controller to retrieve selected data packets from said buffer such that the data packets are directed to available cellular channels during the intervals between first network calls.

3. The system of claim 2 in which the predominately voice-carrying first cellular network provides multiple cellular channels on selected predetermined cellular frequencies through the use of multiplexing, whereby each transceiver in said shared base stations carries a plurality of cellular channels, including a multiplex controller at each said shared base station, and said data packet call controller being operated in coordination with said multiplex controller at each shared base station for inserting data packets from said buffer in the available cellular channel.

4. The system of claim 1 in which the predominately voice-carrying first cellular network provides multiple cellular channels on selected predetermined cellular frequencies through use of time division multiplexing, whereby each transceiver in said shared base stations carries a plurality of cellular channels in different predetermined time slots, including a time slot controller at each said shared base station, and said data packet call controller being operated in coordination with said time slot controller at each shared base station for inserting data packets from said buffer in the time slot of the available cellular channel during intervals between first network calls.

5. A method of sharing the cellular channels of a predominately voice-carrying first cellular network with packetized data cellular calls carried on a cellular data network connected to a public packet data network of the type which selectively transfers data packets via the cellular data network between users of the public packet data network and mobile cellular data stations, the first cellular network being of the type that includes a plurality of base stations each having a plurality of transceivers which operate at one or more predetermined frequencies, the transceivers each providing at least one cellular channel which carries first network calls to and from mobile cellular telephones, and each base station includes a base station controller for directing incoming first network calls to idle channels carried by a selected transceiver at the base station, each cellular channel being at least briefly idle between the end of one first network call on the channel and the beginning of the next first network call, the method comprising the steps of:

operatively linking the cellular data network to at least some of the base stations used by the first cellular network to provide shared base stations used by both the cellular data network and the first cellular network and, at each said shared base station;

operatively connecting the first cellular network to the base station controller, wherein the base station controller directs first network calls to and from transceivers within the base station;

operatively connecting the cellular data network to the same base station controller used in the preceding step, wherein the base station controller directs data packets carried via the cellular data network to and from transceivers within the base station, and;

the base station controller directing first network calls from the first cellular network and data packets from the cellular data network to cellular channels carried by selected transceivers in the base station in accordance with the following step:

when the base station controller identifies idle periods on a channel between the end of one first network call and the beginning of the next first network call, the base station controller selectively directs one or more data packets from the cellular data network to the transceiver carrying such channel for receipt or transmission of the one or more data packets during the intervals between first network calls, whereby the transceivers and cellular channels used by the shared base station carry predominately voice calls over the first cellular network and intermittently carry data packets from the cellular data network over the same cellular channels and transceivers.

6. A method as in claim 5 including, at each shared base station as part of the step of operatively connecting the cellular data network to the base station used to direct first network calls, providing a data buffer for temporarily storing data packets from cellular data calls in the operative connection between the base station and the cellular data network, including the step of selectively storing one or more data packets in the data buffer until the base station controller directs the one or more data packets to a selected cellular channel, and further including, in the step of selectively directing one or more data packets from the cellular data network to the transceiver carrying the selected channel, retrieving the one or more stored data packets from the data buffer for transfer to the transceiver carrying the selected channel during the interval between first network calls.

7. A method as in claim 5 in which the first cellular network uses time division multiplexing to provide multiple first network cellular channels on selected predetermined frequencies, said step of the base station controller selectively directing one or more data packets from the cellular data network to the transceiver including, for each first network cellular channel into which data packets are inserted, inserting the data packets into the time division of the cellular channel.

8. A method as in claim 5 in which the first cellular network uses multiplexing to provide multiple first network cellular channels on selected predetermined frequencies, said step of the base station controller selectively directing one or more data packets from the cellular data network to the transceiver including, for each first network cellular channel into which data packets are inserted, inserting the data packets into the available multiplexed cellular channel.

* * * * *